No. 768,515. PATENTED AUG. 23, 1904.
A. COLLET.
MOTOR VEHICLE FOR RUNNING ON ROADS OR RAILS.
APPLICATION FILED FEB. 6, 1904.
NO MODEL. 2 SHEETS—SHEET 1.

Witnesses: Inventor
Albert Collet
by Henry Cannett
Attorney

No. 768,515. PATENTED AUG. 23, 1904.
A. COLLET.
MOTOR VEHICLE FOR RUNNING ON ROADS OR RAILS.
APPLICATION FILED FEB. 6, 1904.
NO MODEL. 2 SHEETS—SHEET 2.

Witnesses: Inventor.

No. 768,515.

Patented August 23, 1904.

UNITED STATES PATENT OFFICE.

ALBERT COLLET, OF PARIS, FRANCE.

MOTOR-VEHICLE FOR RUNNING ON ROADS OR RAILS.

SPECIFICATION forming part of Letters Patent No. 768,515, dated August 23, 1904.

Application filed February 6, 1904. Serial No. 192,260. (No model.)

*To all whom it may concern:*

Be it known that I, ALBERT COLLET, a citizen of the French Republic, residing at Paris, France, have invented certain new and useful Improvements in Motor-Vehicles, of which the following is a specification.

This invention relates to self-propelled or motor vehicles, and especially to electric-motor vehicles; and the object of the invention is to provide such a vehicle adapted to run either on common roads or on a railway. To this end the vehicle has a pair of ground-wheels to support and carry it on a common roadway and two pairs of flanged track-wheels to support the vehicle when it runs on the rails of a railway. The ground-wheels are adapted to be raised so as to allow the flanged wheels to support the vehicle and to be lowered or depressed so as to allow the vehicle to be wholly supported on the ground-wheels. The flanged wheels are each adapted to be turned about an upright axis a quarter-turn, or through ninety degrees, so that they may run on rails extending transversely of the vehicle for reasons that will be hereinafter explained.

Figure 1:
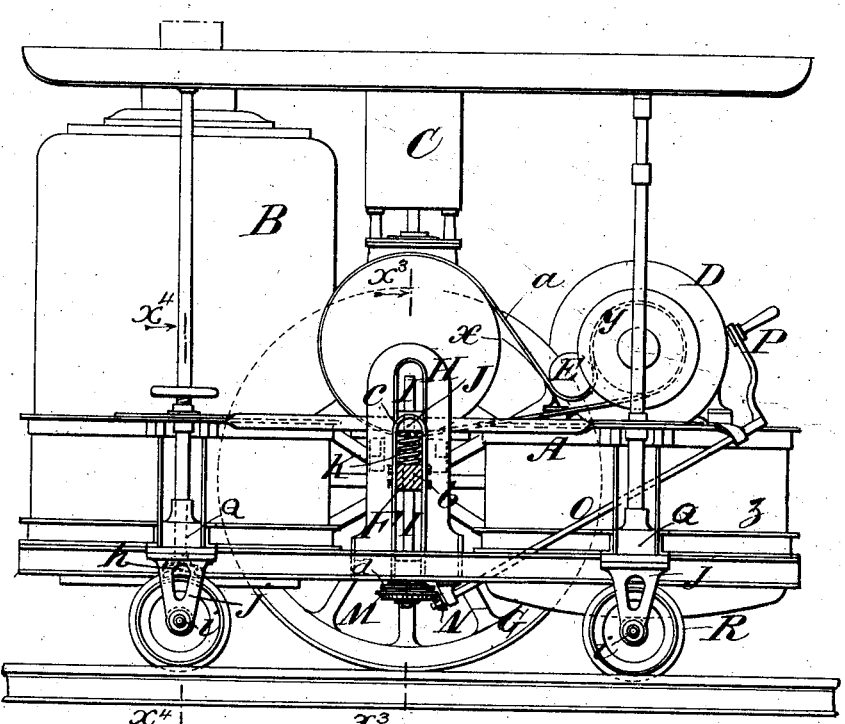
Figure 2:
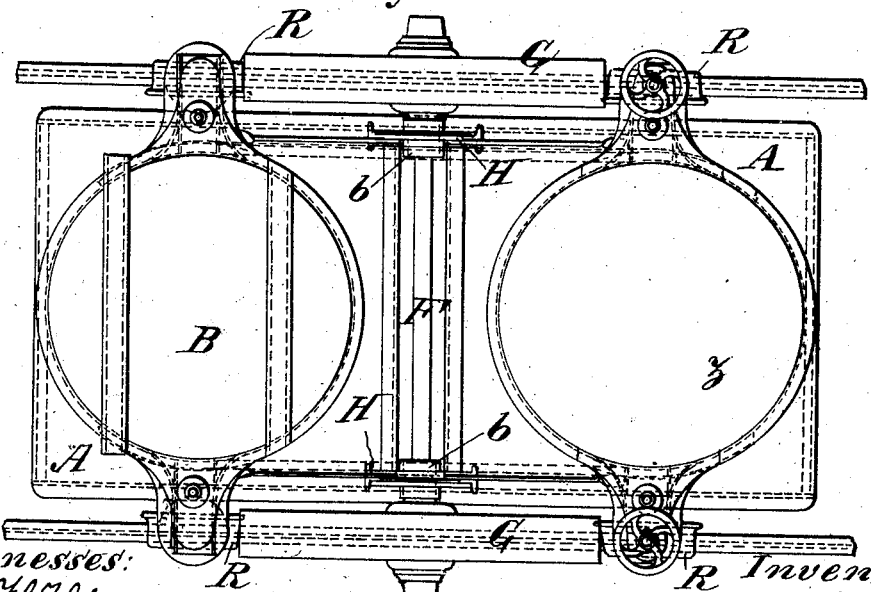
Figure 4:
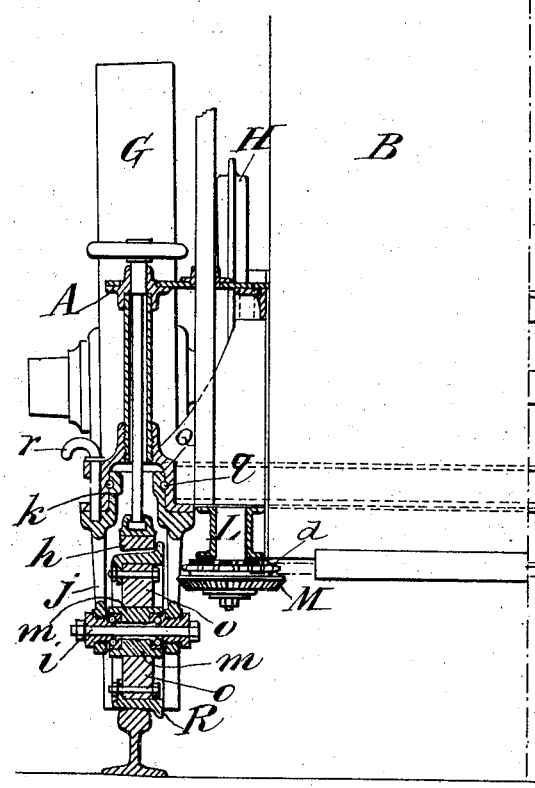
Figure 3:
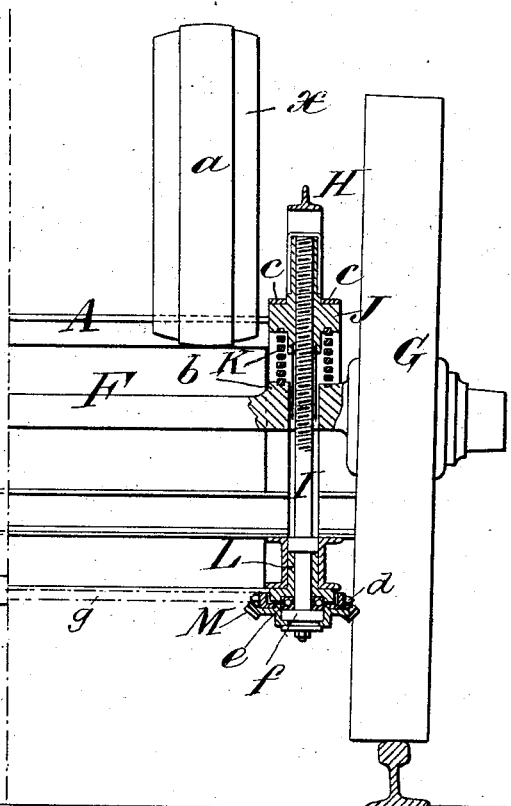

In the accompanying drawings, which illustrate an embodiment of the invention, Figure 1 is a side elevation of the vehicle, shown as mounted on track-rails. Fig. 2 is a plan. Some of the driving mechanism is omitted from this view. Fig. 3 is a transverse section of one half or side of the vehicle, taken at line $x^3$ in Fig. 1; and Fig. 4 is a similar section of the other half or side thereof, taken at line $x^4$ in Fig. 1.

A designates in general the frame or body of the vehicle, which in the example shown carries a steam-generator B, a motor or engine C, and a dynamo D, with its accessories. A belt $a$, having a suitable tightening device E, connects the pulley $x$ of the engine with the pulley $y$ of the dynamo for driving. Beneath the dynamo is a tank $z$ to contain water to balance the load relatively to the axle of the vehicle. The above features may be of any kind and form no essential part of this invention.

G are the ground-wheels rotative on journals or arms on a transverse axle F, which is non-rotative and is movable up and down in suitable guide-bearings in or on the frame.

H represents the upright slotted guides in which the axle F plays. The axle has cheeks or bearing-plates $b$, which play along the upright sides of the slotted guideway. A nut J slides in the slot in the guide H above the axle, and this nut is connected to the axle by stirrups $c$. These stirrups are fixed below to the axle and take over the nut above, and between the axle and the nut is a spring K.

Collared in a socket L, fixed to the frame below, is an upright screw I, which passes freely through the axle F and screws through the nut J. By rotating this screw, which is collared against endwise movement, the axle F and the wheels G thereon may be raised and lowered with respect to the frame A. The screw I may be rotated through the medium of a toothed wheel M, secured on the head $f$ of the screw, and a pinion N, gearing with the wheel M and fixed on an oblique shaft O, provided with an operating-crank P. The screws I at opposite sides of the vehicle may be rotated simultaneously from either crank P by connecting the screws through the medium of sprocket-wheels $d$ and a chain $g$. These features are indicated in Figs. 3 and 4. In Fig. 3 a ball-bearing for the screw is also shown.

At opposite sides of the ground-wheels G are flanged track-wheels R—two pairs, one pair at each side of the axle F. As the wheels R are alike and mounted in the same manner, a description of one will suffice. The flanged wheel, which as here shown is much smaller than the ground-wheel G, rotates on a shaft $i$, Fig. 4, which is supported at its ends in bearing-pieces $j$, pendent from a cylindrical pedestal $k$, which is rotative about an upright axis in a socket Q on the frame. It may have a ball-bearing at $q$. The wheel R in order to insulate its flanged metal rim from its metal hub or nave $m$ has a wooden web $o$. The object of this is to insulate the nave $m$ electrically from the metal rail on which the wheel runs. This is important where the vehicle carries an electric motor and where it is necessary to insulate the metal frame of the vehicle from the metal track-rails.

The operation will be readily understood. When the vehicle is brought over an ordinary road to a level crossing of a railway, it rests on its ground-wheels G, the flanged wheels R being then elevated and out of contact with the ground. When the vehicle is placed on the track-rails with the ground-wheels resting on the rails and the flanged wheels occupying a position directly over the same, the wheels G are raised by the screws I and the wheels R settle to the places on the rails. To remove the vehicle from the track-rails at any point, the wheels G may be depressed until the flanged wheels R are lifted clear of the rails. These wheels R may then be turned, with the pedestals k about the upright axis of the latter and rails placed under them. The wheels G are then raised, or, what is the same thing, the vehicle-frame is lowered, until the wheels R rest on the placed rails and the vehicle then removed laterally or sidewise from the railway, the wheels R rolling on the placed rails.

When the pedestals k are in their proper positions, they are prevented from turning about their axes by suitable locking means. In Fig. 4 such locking means is represented as comprising a bolt or pin r, engaging a socket in the pedestal.

It will be obvious that when the wheels G are depressed until they find a bearing on the ground the further operation of the screws I simply lifts the frame or body A together with the track-wheels R. If the screws be then turned in the opposite direction, the effect is to lower the frame or body and the track-wheels until the latter find a bearing, after which the wheels G will be lifted from the track-rails or ground. In the previous description for convenience the screws I have been referred to as merely moving the axle F and its wheels up and down.

Having thus described my invention, I claim—

1. A motor-vehicle, having a frame, an axle movable up and down in said frame, ground-wheels rotatable on said axle, means for moving said axle up and down in the frame, and flanged track-wheels on said frame for operating the vehicle on track-rails when the ground-wheels are elevated, substantially as and for the purpose set forth.

2. A motor-vehicle, having a frame, an axle F movable up and down in upright guides H on the frame, the said guides H, ground-wheels G rotatable on said axle, screws and nuts for moving said axle up and down in its guides, and four flanged track-wheels R, two at each side of the axle F, to support the vehicle on rails when the ground-wheels are elevated.

3. A motor-vehicle, having a frame, an axle F movable up and down in upright guides H on the frame, the said guides H, ground-wheels G rotatable on said axle, means for moving said axle in its guides, four pedestals k, rotatively mounted on vertical axes in the frame, and flanged wheels R rotatively mounted in the respective pedestals.

4. A motor-vehicle, having a frame, guides H on said frame, an axle F slidable up and down in said guides, nuts J slidable up and down in the respective guides, stirrups c connecting the axles with the respective nuts, springs K between the respective nuts and the axle, screws I, collared in the frame and extending up through the respective nut and axle for moving the latter up and down in its guides, and the flanged track-wheels on the vehicle.

5. A motor-vehicle, having track-wheels each provided with flanged metal rim, a metal boss, and an intermediate web of insulating material.

In witness whereof I have hereunto signed my name, this 16th day of January, 1904, in the presence of two subscribing witnesses.

ALBERT COLLET.

Witnesses:
JULES ARMENGAUD, Jeune,
HANSON C. COXE.